United States Patent
Sausner et al.

[11] Patent Number: 5,291,924
[45] Date of Patent: Mar. 8, 1994

[54] SEALING SYSTEM FOR USE IN THE FILLER NECK OF A FUEL TANK

[75] Inventors: Andreas Sausner, Frankfurt am Main; Jens Sielaff, Wald-Michelbach, both of Fed. Rep. of Germany

[73] Assignee: Firma Carl Freudenberg, Weinheim, Fed. Rep. of Germany

[21] Appl. No.: 779,348

[22] Filed: Oct. 17, 1991

[30] Foreign Application Priority Data

Oct. 30, 1990 [DE] Fed. Rep. of Germany ....... 4034467

[51] Int. Cl.$^5$ .............................................. B65B 3/04
[52] U.S. Cl. .................... 141/312; 141/382; 141/387; 220/86.2
[58] Field of Search ............... 220/86.2; 141/312, 206, 141/301, 302, 382, 387, 388, 389

[56] References Cited
U.S. PATENT DOCUMENTS

| | | | |
|---|---|---|---|
| 2,247,509 | 7/1941 | Lebus | 220/86.2 |
| 2,503,031 | 4/1950 | Davidson | 220/86.2 X |
| 2,551,058 | 5/1951 | Selzler et al. | 220/86.2 |
| 2,695,161 | 11/1954 | Lebus | 220/86.2 X |
| 4,762,247 | 8/1988 | Temmefeld | 220/303 |
| 4,917,157 | 4/1990 | Gifford et al. | 141/302 X |
| 4,941,587 | 7/1990 | Terada | 220/86.2 X |
| 4,946,060 | 8/1990 | Sherwood et al. | 220/86.2 |
| 4,966,299 | 10/1990 | Teets et al. | 220/86.2 X |
| 4,977,936 | 12/1990 | Thompson et al. | 141/312 |
| 4,995,433 | 2/1991 | Beicht et al. | 141/312 |
| 5,027,868 | 7/1991 | Morris et al. | 141/302 X |
| 5,040,575 | 8/1991 | Oeffling et al. | 220/86.2 X |
| 5,056,570 | 10/1991 | Harris et al. | 220/86.2 X |

Primary Examiner—Allan N. Shoap
Assistant Examiner—Stephen Cronin
Attorney, Agent, or Firm—Felfe & Lynch

[57] ABSTRACT

Sealing system for use in the filler neck of a fuel tank, comprising a radial gasket for sealing a filler gun which can be introduced into the filler neck, a sealing surface, and an axial gasket between said sealing surface and a lead-free valve. The lead-free valve is fastened to a spring-loaded lever and urged by the lever against the axial gasket. The lead-free valve and/or the axial gasket are supported pivotingly with respect to the central axis of the filler neck and can thereby be laid flatly against one another.

8 Claims, 2 Drawing Sheets

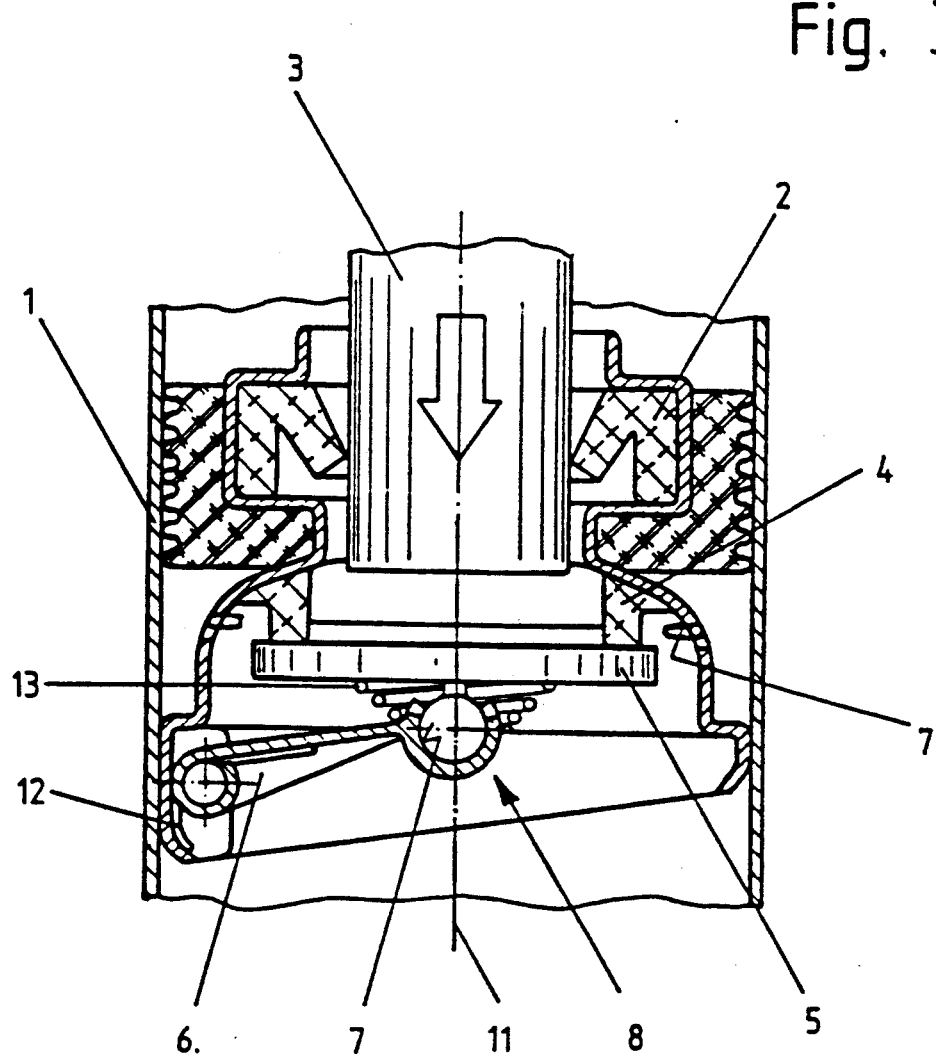

SEALING SYSTEM FOR USE IN THE FILLER NECK OF A FUEL TANK

BACKGROUND OF THE INVENTION

The invention relates to a sealing system for use in the filler neck of a fuel tank, including a radial gasket for a filler gun that can be introduced into the filler neck, and an axial gasket independent thereof for sealing a valve, the lead-free valve being fastened to a spring-loaded lever and urged by the lever against the axial gasket. The term "lead-free valve" as used herein refers to a self sealing valve of the type used in vehicles which accept only lead free gasoline.

A sealing system of this kind is disclosed in German Patent 38 29 948, to which U.S. Pat. No. 4,995,433 corresponds. The lead-free valve contained therein is intended to prevent the escape of fuel vapors outside of the tank-filling periods. It still does not satisfy in a desirable manner the environmental protection concerns in this regard.

The invention is addressed to the problem of improving a sealing system of the kind specified above such that a reliable sealing of the fuel tank by the lead-free valve will be assured for a long period of use.

SUMMARY OF THE INVENTION

In the sealing system of the invention, provision is made for the lead-free valve and/or the axial gasket to be supported for pivoting with respect to the central axis of the filler neck, and for them to be placeable flatly against one another. Skewing of the lead-free valve with respect to the axial seal, which might occur in manufacture and/or assembly, is thus automatically corrected, and even in extreme cases a tight engagement of the two parts against one another is thereby assured. Troublesome checking of the sealing action achieved can be eliminated in most cases. It has proven to be especially desirable if the lead-free and/or the axial gasket are supported on a spherically configured contact surface. In this manner even relatively great misalignments can be compensated easily when the lead-free valve is closed.

The idea of the invention is fundamentally satisfied by an embodiment in which only one of the contact surfaces is spherically configured. This surface can be provided between the lever and the lead-free valve and form, for example, one component of a ball joint. The changes in the known sealing system in the sense of the present invention are especially simple from this viewpoint.

If a ball joint is used it has been found advantageous for it to be self-binding.

The term "self-binding" is to be understood to mean, in this connection, that relative movements within the joint are possible only by forces which in their amount correspond at least to the forces which are produced in the lever by its spring loading. After the lead-free valve has once positioned itself with respect to the lever it will require no further adjustment in normal use. After the lead-free valve has been set to its closed position, a gas-tight contact between the axial gasket and the lead-free valve is thus instantaneously assured over their entire circumference.

The lead-free valve can be supported on the lever for tilting about the axis by means of a coil spring. It is particularly easy to achieve this tilting ability in a construction of this kind. Sticking that might interfere with tilting is just about impossible, and good usefulness is thus assured over an especially long time of use.

The lead-free valve and/or the axial gasket can be provided with at least one vertically upstanding circumferential sealing ridge which can be brought into contact with the axial gasket or lead-free valve, respectively. By making use of labyrinth effects and the like, this permits the improvement of the sealing action.

Similar purposes are served by a configuration in which the lead-free valve and/or the axial gasket are provided with at least one circumferential sealing groove recessed vertically, which can be brought in contact with the axial gasket or the lead-free valve.

Between sealing areas succeeding one another in the radial direction, flow-dynamic dead spaces are thus created, in which fuel vapors passing through the gap condense and are thus prevented from escaping.

An optimum sealing action can be achieved if the lead-free valve and/or the axial gasket are provided with at least one circumferential upstanding sealing ridge which can be brought into engagement with a groove in the axial gasket or lead-free valve. The result is a labyrinth effect which substantially improves the sealing action achieved, especially in cases in which the sealing ridge and the groove in such a configuration match one another in shape and size.

On account of the supporting of the lead-free valve and/or the axial gasket on a spherically shaped contact surface, it is no longer essential to produce at least one of the two parts from a soft, resilient material. Instead, hard materials can be used on both sides while assuring a good sealing action. These materials cna be used on both sides while assuring a good sealing action. These materials can easily be produced with a high dimensional precision, and they are characterized by availability at reasonable cost and often by an extraordinary great dimensional precision under long-term exposure to fuel vapors. This is of great advantage for the practical value of the sealing system in accordance with the invention.

BRIEF DESCRIPTION OF THE DRAWINGS

FIG. 3 is a longitudinal section of a further embodiment.

DETAILED DESCRIPTION OF THE PREFERRED EMBODIMENT

Figure 1:
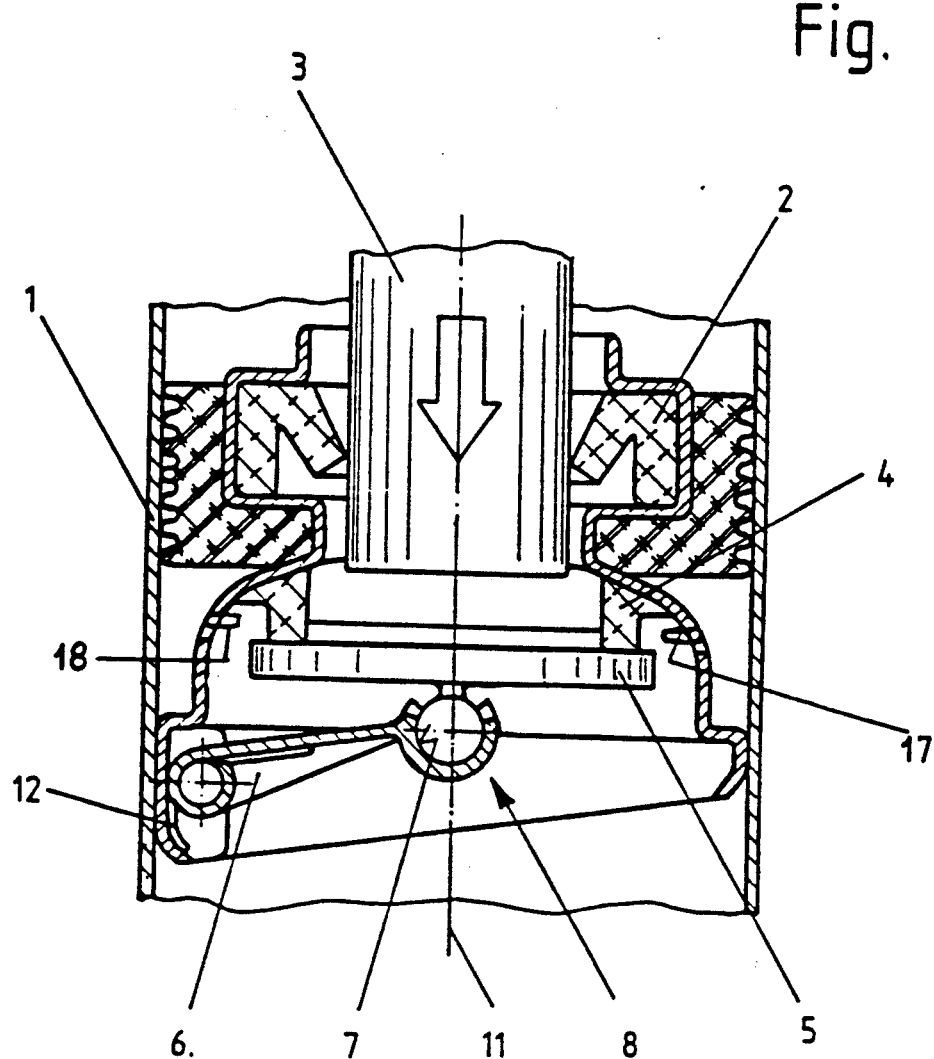
FIG. 1 is a longitudinal section of a portion of a sealing system of the kind according to the invention.

The sealing system shown in FIG. 1 is intended for use in the filler neck 1 of a fuel tank. It includes a radial gasket 2 for sealing a filler nozzle 3 which can be introduced into the filler neck, and an axial gasket 4 independent thereof to seal a lead-free valve 5. The lead-free valve 5 is fastened to a spring-loaded lever 6 and can be urged by the lever 6 against the axial gasket 4. The lead-free valve 5 and the axial gasket 4 in the embodiment depicted are supported against spherically rounded contact surfaces 7, 17 and can lie flush against one another. The rounded contact surface 7 between the lead-free valve 5 and the lever 6 forms a component of a ball joint 8 which is self-binding. The self-binding is made such that the force of the spring 12 urging the lever 6 is sufficiently great to assure sealing contact on the entire circumference between the lead-free valve 5 and the axial gasket 4. After the achievement of an optimum basic position in this regard, normally no further change will be produced in the positional association of the lead-free valve 5 with the lever 6. During a closing movement, therefore, the result is a sealing contact between the lead-free valve 5 and the axial gasket 4 within the shortest possible period of time.

Note in FIG. 1 that retaining nubs 18 extend radially inward from contact surface 17 and serve to retain the axial gasket 4 when it is not urged against the support surface 16 by valve 5. It is also possible to fix the gasket to surface 17, whereby the swivel action of ball joint 8 will assure a sealing contact between the valve 5 and the gasket 4. Another possibility is to fix the gasket 4 to the valve 5, whereby the swivel action of ball joint 8 will assure a sealing contact between the gasket 4 and the surface 17.

Figure 2:
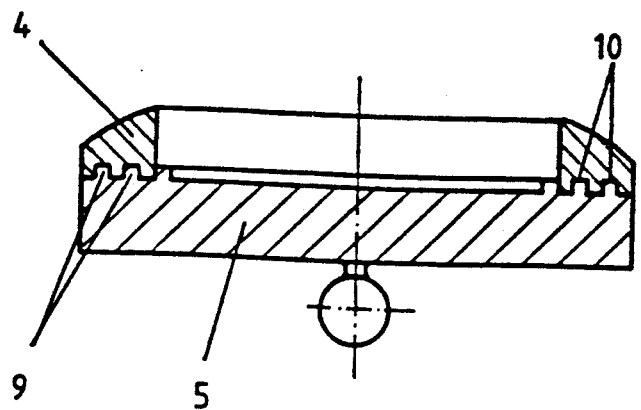
FIG. 2 is a longitudinal section of an exemplary construction of the axial gasket and lead-free cap.

FIG. 2 shows an axial gasket 4 and a lead-free valve 5 in longitudinal section. Both parts consist, in this variant, of a hard material. The axial gasket 4 and the lead-free valve 5 are of circular shape and provided with a plurality of concentric grooves and lands 9 and 10, respectively, which correspond in shape and size and fit sealingly into one another. In spite of the use of hard materials for the production of the two parts, an excellent sealing action is thereby achieved.

In the embodiment shown in FIG. 3 the ball joint 8 is not made self-binding. The lead-free valve 5 is supported for binding relative to the lever 6 by a coil spring 13. In this manner an especially good and long-lasting reliability of operation is assured in addition to simplified production.

What is claimed is:

1. Sealing system for use in the filler neck of a fuel tank, said filler neck having a central axis and a radial gasket for sealing a filler nozzle inserted in said neck, said system comprising
    a sealing surface concentric to the axis of said filler neck,
    a spring loaded lever,
    a valve attached to said spring loaded lever by a ball joint and urged by said lever with a force toward said sealing surface,
    means causing said ball joint to bind so that movements within the joint are possible only by forces at least as great as the force produced by said spring loaded lever,
    an axial gasket independent of said radial gasket and lying between said valve and said sealing surface, and
    means for permitting pivoting of at least one of said valve and said axial gasket relative to said axis of said filler neck.

2. System as in claim 1 wherein said sealing surface is spherically shaped.

3. System as in claim 1 wherein said ball joint is self-binding.

4. System as in claim 1 wherein at least one of said valve and said axial gasket has circumferential vertical projecting ridge means to improve sealing between said valve and said axial gasket.

5. System as in claim 1 wherein at least one of said valve and said axial gasket has circumferential recessed groove means to improve sealing between said valve and said axial gasket.

6. System as in claim 1 wherein one of said valve and said axial gasket has at least one circumferential projecting ridge, the other of said lead-free valve and said axial gasket having at least one recessed groove engaged by said at least one ridge to improve sealing between said valve and said axial gasket.

7. System as in claim 6 wherein said at least one ridge and said at least one groove match each other in shape and size.

8. Sealing system as in claim 1 wherein said means causing said ball joint to bind comprises a coil spring surrounding said ball joint between said lever and said valve.

* * * * *